United States Patent
Zhu

(10) Patent No.: US 7,146,159 B1
(45) Date of Patent: Dec. 5, 2006

(54) OVER-THE-AIR CARD PROVISIONING SYSTEM AND METHOD

(75) Inventor: Weiwen Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 164 days.

(21) Appl. No.: 10/744,169

(22) Filed: Dec. 23, 2003

(51) Int. Cl.
*H04M 3/42* (2006.01)

(52) U.S. Cl. ............. 455/414.1; 455/411; 455/550.1; 235/380; 235/382; 235/472.01; 235/472.02; 705/35; 705/38; 705/41; 705/44

(58) Field of Classification Search ........ 455/406–408, 455/410–411, 414.1, 414.2, 414.3, 414.4, 455/426.1, 426.2, 550.1, 588; 235/375, 379, 235/380, 487, 492, 493, 382, 382.5, 472.02, 235/472.01; 705/1, 38, 44, 35, 41
See application file for complete search history.

(56) References Cited

U.S. PATENT DOCUMENTS

| | | | | |
|---|---|---|---|---|
| 5,276,311 A * | 1/1994 | Hennige | ............... | 235/380 |
| 5,590,038 A * | 12/1996 | Pitroda | ............... | 705/41 |
| 6,000,608 A * | 12/1999 | Dorf | ............... | 235/380 |
| 6,012,634 A * | 1/2000 | Brogan et al. | ............... | 235/380 |
| 6,199,161 B1 * | 3/2001 | Ahvenainen | ............... | 713/155 |
| 6,290,127 B1 * | 9/2001 | Schilling | ............... | 235/382.5 |
| 6,360,954 B1 * | 3/2002 | Barnardo | ............... | 235/492 |
| 6,405,181 B1 * | 6/2002 | Lent et al. | ............... | 705/38 |
| 6,466,777 B1 * | 10/2002 | Urita | ............... | 455/410 |
| 6,591,098 B1 * | 7/2003 | Shieh et al. | ............... | 455/419 |
| 6,631,849 B1 * | 10/2003 | Blossom | ............... | 235/492 |
| 6,755,342 B1 * | 6/2004 | Jordan, Jr. | ............... | 235/380 |
| 6,817,521 B1 * | 11/2004 | Matada | ............... | 235/380 |
| 6,938,821 B1 * | 9/2005 | Gangi | ............... | 235/380 |
| 2001/0013551 A1 * | 8/2001 | Ramachandran | ....... | 235/472.02 |
| 2002/0052193 A1 * | 5/2002 | Chetty | ............... | 455/412 |
| 2002/0088852 A1 * | 7/2002 | Ohta et al. | ............... | 235/381 |
| 2002/0128982 A1 * | 9/2002 | Gefwert et al. | ............... | 705/67 |
| 2002/0136199 A1 * | 9/2002 | Hartmaier | ............... | 370/352 |
| 2002/0195487 A1 * | 12/2002 | Hosogoe | ............... | 235/380 |
| 2003/0045328 A1 * | 3/2003 | Natsuno | ............... | 455/558 |
| 2003/0125054 A1 * | 7/2003 | Garcia | ............... | 455/466 |
| 2003/0161503 A1 * | 8/2003 | Kramer | ............... | 382/115 |
| 2003/0220876 A1 * | 11/2003 | Burger et al. | ............... | 705/50 |
| 2003/0233320 A1 * | 12/2003 | Connor | ............... | 705/39 |
| 2004/0044622 A1 * | 3/2004 | Blott et al. | ............... | 705/40 |
| 2004/0122685 A1 * | 6/2004 | Bunce | ............... | 705/1 |
| 2004/0139024 A1 * | 7/2004 | So | ............... | 705/51 |
| 2004/0159700 A1 * | 8/2004 | Khan et al. | ............... | 235/380 |
| 2004/0198333 A1 * | 10/2004 | Zanaty | ............... | 455/418 |
| 2004/0204070 A1 * | 10/2004 | August et al. | ............... | 455/557 |

FOREIGN PATENT DOCUMENTS

WO    WO 2004 105421 A2 *  12/2004

* cited by examiner

*Primary Examiner*—William Trost
*Assistant Examiner*—James D. Ewart

(57) ABSTRACT

A system for over-the-air provisioning of a card on a wireless device is provided. The system includes a wireless device, a provisioning system in communication with the wireless device, and an issuer system to maintain an account related to a card. The issuer system is operable to wirelessly enable the card on the wireless device via the provisioning system. A method for over-the-air card provisioning of a wireless device is also provided. The method includes authorizing, by an issuer, an account related to a card, and wirelessly provisioning the card on a wireless device.

56 Claims, 5 Drawing Sheets

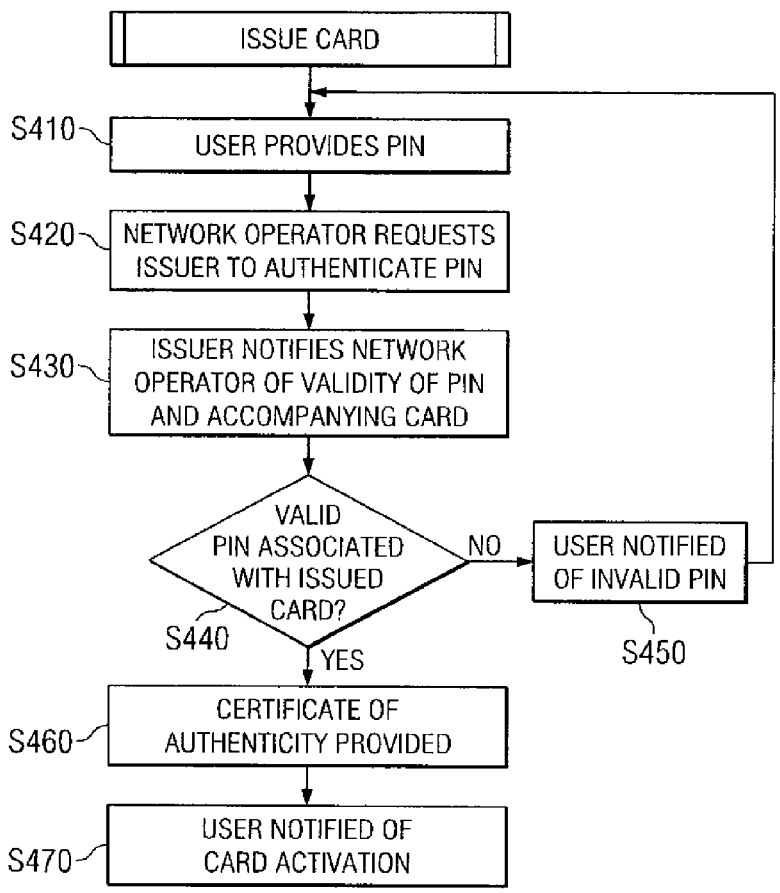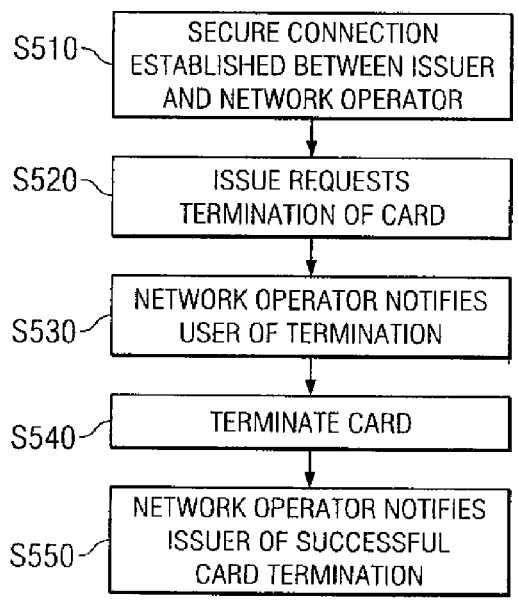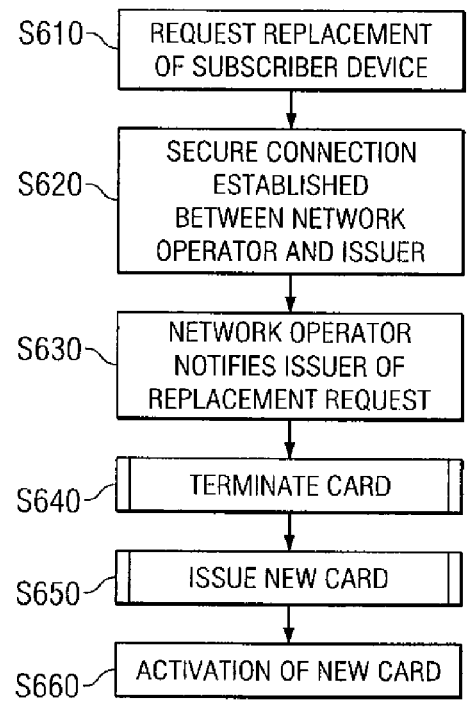

OVER-THE-AIR CARD PROVISIONING SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to provisioning credit and other cards, and more particularly, but not by way of limitation, to a system and method for over-the-air card provisioning to enable credit and other cards and accounts. The present system and method provides for wirelessly storing information to enable the credit and other cards and/or accounts to enable the card to perform transactions by various communication means, such as by communicating with various reader transaction devices, which are capable of receiving and processing the information.

BACKGROUND OF THE INVENTION

Conventional credit, debit, loyalty and other cards are widely known and used for their convenience. These cards are frequently embodied in a plastic form and are provided in various shapes and sizes. Moreover, to further the appeal to consumers, these cards are being equipped with chips as smartcards to provide faster, more secure, transactions and to provide additional features. In the arrangements that allow for contact-less transactions, the smartcard credit cards are provided with a contact-less interface that interacts with a reader device to process card transactions. Specifically, the card is brought into close proximity with the reader transaction device, data is exchanged via the contact-less interface in the card and the reader device, and the transaction is processed.

However, while these features make credit cards more attractive for consumers, a consumer must carry each plastic credit card individually in order to take advantage of the features these cards offer. This is not only an inconvenience for consumers, but also a burden to credit card issuers due to the cost of the traditional card personalization process, which requires the issuers to provision and mail the cards to many consumers, and repeat the process when replacing expired cards.

SUMMARY OF THE INVENTION

The present disclosure provides a system for over-the-air provisioning of a card on a wireless device. The system includes a wireless device, a provisioning system in communication with the wireless device, and an issuer system to maintain an account related to a card. The issuer system is operable to wirelessly enable the card on the wireless device via the provisioning system. A method for over-the-air card provisioning of a wireless device is also provided. The method includes authorizing, by an issuer, an account related to a card, and wirelessly provisioning the card on a wireless device.

In one embodiment, a method for managing a card operable on a wireless device is provided. The method includes transmitting a signal between a wireless device and a network, the signal related to the operability of a card on the wireless device. The signal is used by at least one of the network and wireless device. The method also provides for changing the operability of the card on the wireless device based on the signal.

In another embodiment, a method of provisioning a card over-the-air on a wireless device when replacing wireless devices is provided. The method includes wirelessly communicating with a first wireless device, and disabling a card on the first wireless device. The method further provides for wirelessly communicating with a second wireless device, and provisioning the card on the second wireless device.

In another embodiment, a method for enabling a default card on a wireless device is provided. The method includes providing a wireless device, and enabling a plurality of cards on the wireless device. The method includes providing a wallet application operable on the wireless device for selecting cards, and activating one of the plurality of cards as a default card on the wireless device.

In yet another embodiment, a system for over-the-air provisioning of a card is provided. The system includes a wireless device and a medium in communication with the wireless device. The medium is operable to store card information. The system includes a provisioning system in communication with the wireless device and an issuer system to maintain an account related to a card. The issuer system is operable to wirelessly enable the card on the medium using the provisioning system and wireless device.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings and the detailed description, wherein like reference numerals represent like parts.

Exemplary embodiments are described herein with reference to the drawings, in which:

FIG. 4 is a flow chart which illustrates a card activation process in accordance with the exemplary embodiment;

FIG. 5 is a flow chart which illustrates a card termination process in accordance with the exemplary embodiment;

FIG. 6 is a flow chart which illustrates a process for terminating a card and issuing a new card when a subscriber wireless device is replaced in accordance with the exemplary embodiment;

DETAILED DESCRIPTION OF THE PREFERRED EMBODIMENTS

It should be understood at the outset that although an exemplary implementation of one embodiment of the present system is illustrated and described, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents. Moreover, particularly in telecommunications applications, those skilled in the art will appreciate that many of elements and functional steps described herein can be implemented by any number of means including, discrete components or processors executing machine code, or any combination of the two. Furthermore, it is understood that the components and steps described herein can be substituted for, or omitted altogether in accordance with known customs and practices and the knowledge of those skilled in the art.

Figure 1:
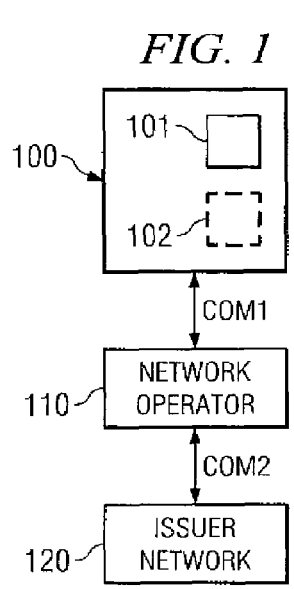
FIG. 1 is a system drawing according to an exemplary embodiment of the present design.

FIG. 1 illustrates an embodiment of the present system. Depicted are a subscriber device 100, a network operator 110, and an issuer 120. As shown, subscriber device 100 is linked to network operator 110 via communication medium COM1, and similarly, network operator 110 is linked to issuer 120 via communication medium COM2. In accordance with such an arrangement, electronic data can be exchanged between subscriber device 100 and network operator 110 via communication medium COM1, and electronic data can be exchanged between network operator 110 and issuer 120 via communication medium COM2. In a preferred embodiment, communication medium COM1 is any suitable wireless communication network, including, but not limited to a code division multiple access (CDMA) network, a time division multiple access (TDMA) network, and a global system for mobile communications (GSM) network and a wireless local area network; and communication medium COM2 is the Internet. However, communication mediums COM1 and COM2 are not limited to any particular type of communication network, as will be appreciated by those skilled in the art. Further, FIG. 1 is not intended to limit communication to that between subscriber device 100 and network operator 110 only, or similarly, to limit communication to that between network operator 110 and issuer 120 only. In fact, subscriber device 100 may communicate with issuer 120 via network operator 110, or directly, and issuer 120 may communicate with subscriber device 100 via network operator 110, or directly. Furthermore, communication sequences are not limited and it is contemplated that communication may simultaneously occur between any of subscriber device 100, network operator 110 and issuer 120.

Although not illustrated, appropriate security measures, such as firewalls, can be provided to monitor network traffic and detect unwanted network traffic. For instance, firewalls can be provided to protect the systems of network operator 110 and issuer 120. Although security measures are not illustrated, these mechanisms are omitted from the illustrations for simplicity and it is understood that those skilled in the art appreciate that these elements are typically present in some form or degree.

Subscriber device 100 can be any wireless user device, for example, a digital and/or cellular phone, a pager, or a Personal Digital Assistant, or device operable for radio signaling, for example. In the illustrated embodiment, subscriber device 100 has a user interface 101. Further, subscriber device 100 may provide wireless communicating capability, as well as Internet browsing capability and other functionality.

In accordance with the present embodiment, subscriber device 100 is equipped with a client module 102. In various embodiments, client module 102 may be capable of some or all of the following functions including controlling storage, providing security, logging, synchronizing transaction records, loading and presenting information relating to credit and other cards and accounts including, for example, information relating to any number of credit card accounts, bank accounts, security passes, access card accounts, membership card accounts, and loyalty accounts. Accordingly, in some embodiments, client module 102 includes a transaction module or portion that enables subscriber device 100 to directly communicate with reader transaction devices, which may include devices maintained by access or security authorities, banks, credit issuers, vendors, and employers, for example. It will be appreciated that functionality enabled by the transaction module may be integral to or in some embodiments be a separate component coupled to communicate between the client module 102 and reader transaction devices. For simplicity of disclosure, the illustrated embodiment provides the transaction module integral to the client module 102, although the present disclosure is not limited to this configuration. As such, the client module 102 may directly transmit and receive electronic data to and from reader transaction devices, wirelessly or otherwise, in order to process a transaction that is applicable to the particular card being used. The client module 102 may communicate, such as by the transaction module, with the transaction device at the vendor location via RF, WiFi, BLUE-TOOTH, optically such as using infra-red, or using other means well known in the art. For example, client module 102 can transmit credit or bank account information related to the card that can be received and processed by a reader transaction device maintained by a vendor in order to process a purchase; or, client module 102 can transmit identification information to a reader transaction device maintained by an accessing authority in order to gain access to a facility. Moreover, client module 102 can also be equipped to receive information transmitted from a reader transaction device, for example, a receipt or confirmation, indicating completion of the transaction.

In the present embodiment, client module 102 in subscriber device 100 has a contact-less interface, or a contact-less chip, operable to enable a transaction when subscriber device 100 is brought into transaction range of a reader transaction device, such that a transaction can be performed. According to this embodiment, client module 102 can communicate with a reader transaction device, via the contact-less interface, without requiring physical contact between subscriber device 100 and a reader transaction device. Client module 102 in subscriber device 100 can communicate with the reader transaction device by transmitting and receiving electromagnetic signals, for example, infra-red or radio signals. In another embodiment, client module 102 can communicate with the reader transaction device via a wireless network. In other embodiments, the client module 102 in the subscriber device 100 may communicate with the reader transaction device by physical contact, such as a by a link, a magnetic stripe and reader, or other well known contact reading methods.

In the embodiment wherein client module 102 operates with the contact-less interface, any type of contact-less interface can be used, including an ISO standard based contact-less interface, for example, one based on ISO 14443 standards. However, it is understood that the present system is not limited to contact-less transactions, and communications between client module 102 and a reader transaction device may be accomplished by other methods including bringing wireless device 100 into physical contact with a reader transaction device, for example. Accordingly, as would be appreciated by those skilled in the art, the above description of how client module 102 communicates with a reader transaction device is merely illustrative of one embodiment and does not limit the described system to the configuration described.

In the present embodiment, client module 102 is associated with a memory that is capable of storing data, for example, personal account data relating to the credit and other cards and accounts, as provided above. Specifically, card information stored in the memory includes at least the information that would be necessary to identify the card or account associated with the subscriber device 100 in order to allow client module 102 to execute a transaction using the card. For example, the information stored in the memory may be any of a name, an account number, a validation code, security authentication or other unique identifier.

Further, in the case where information relating to several credit and other cards are stored in the memory, it may be necessary for a user to browse and select a desired card from a plurality of accounts. For example, it may be necessary for a user to select one card from a plurality of credit or other cards, or similarly, to select one identification card from a plurality of identification card. Accordingly, subscriber device 100 can be equipped with organization management capability, for example, a software application, that will allow a user to browse the plurality of cards that are stored and select the desired card to be used for a particular transaction. In addition, such an application may also provide for default selections and user customizations, including those known in the art and associated with browse and select features. For example, subscriber device 100 may be equipped with a single action default selection means wherein the user first sets a default card and thereafter can activate the default card by, for example, pushing a button on subscriber device 100. Additionally, subscriber device 100 may also be equipped with a location selection feature, wherein an appropriate card can be automatically selected for use based on the environment. For example, upon entering a membership only establishment, the appropriate membership card may be automatically selected and made available for use without any further action to select the card on the part of the user. Furthermore, non-fiscal transactions, for example, transactions to gain physical access, may be automatically executed. Of course, other configurations are possible and the device herein is not limited to the example described.

For purposes of this disclosure, the term "account" includes information or portions of information which may be related to, used, or accessed by user, issuers, venders, or others to handle or manage transactions such as by credit cards, debit cards, loyalty or coupon cards, security, access or identification cards, other payment or account devices, and/or transactions of that general nature. For example, an issuer may issue one or more credit or loyalty cards to a customer, such as to several members of the same family or numerous employees of the same business, but the several cards may be combined under one account maintained by the issuer. Card, as the term is used herein, includes at least a portion of the information necessary to enable at least some transactions processing functionality, for example to make a purchase based on a user credit account, regardless of the device or medium upon which this information is provided. For example, the information may be provided on a chip of a smartcard or on a conventional card, or on a permanent or removable storage component coupled to a device, such as a telephone, personal digital assistant or other portable system, medium or device.

It may be necessary to equip client module 102 with a security or authentication feature, which can accompany every transaction for which the subscriber device 100 is used, or alternatively, only accompany transactions requiring elevated security or non-repudiation measures. Accordingly, the memory associated with client module 102 may also be used to store a certificate of authenticity. In one embodiment, a different certificate of authenticity is provided for each respective one of the cards that require security and non-repudiation measures. Alternatively, however, a single certificate of authenticity can be provided for all of the stored cards. Therefore, the integration of client module 102 into subscriber device 100 would enable a user to "carry" and use any number of virtual cards in one device while still providing security. It will be appreciated that a number of technologies, configurations and provisioning of, for example, the certificates, such as digital certificates and other known security measures for authentication, may be employed as well. In the present embodiment, at least a portion of the authentication technology is operable on the subscriber device 100, such as in the client module 102.

In the above description of subscriber device 100, no limitation has been given to the location of the memory that is associated with client module 102. It is understood that the memory can be provided as a component of client module 102, or alternatively, a component of subscriber device 100 but accessible to client module 102 by any means known in the art. Even furthermore, the memory may be portable or removable memory. For example, the memory may be a part of a removable battery used by subscriber device 100, or may be a portable memory useable in various devices including subscriber device 100. In the case where the memory is removable or portable, the memory would be communicatively coupled to subscriber device 100 during the provisioning process, wherein everything that is necessarily required by subscriber device 100 to enable client module 102 to execute a transaction with a particular credit or other card is provided to subscriber device 100. Alternatively, the memory or card information stored on the subscriber device 100 can be maintained remotely by a network controlled by the network operator 110 or issuer 120, for example, and thus, be accessible to a user whenever there is access to the network. Similarly, the organization management application used to organize a plurality of stored cards can be provided as an application of client module 102, or as an application native to subscriber device 100, or on a network accessible to subscriber device 100, for example, wirelessly.

Network operator 110 refers to a controller that includes a provisioning system that enables and disables the functions of the subscriber device 100, and in particular, enables and disables the functions of client module 102 that is provided in subscriber device 100. Notably, although the illustration depicts network operator 110 as separate from issuer 120, network operator 110 can be a part of a network maintained and operated by issuer 120. Alternatively, network operator 110 can be part of the network of a carrier whose wireless communication network supports the use of subscriber device 100. Although in the description which follows, network operator 110 is contemplated as part of the carrier network, as would be appreciated by those skilled in the art, it is within the scope of the present system to locate network operator 110 as part of a network controlled and/or accessed by issuer 120, or by others.

Issuer 120 refers to a network operated by any potential provider of a card that can be stored in client module 102 or entity maintaining an account related to the card. For example, issuer 120 can be a network controlled by any of the following: a bank or other lending institution, a credit card company, a merchant, a buying club, an employer, a civilian authority, or access controller. Additionally, issuer 120 may be managed by a third party manager who manages customer accounts or manages the technical aspects of the issuer's operation.

In accordance with the above described system, the following functions will be described with reference to FIGS. 2–7: (1) a card application process wherein a subscriber applies for card privileges, (2) a card activation process wherein an issuer authorizes a card in a subscribers name, (3) a card cancellation process wherein a subscriber card is discontinued, (4) a card transfer process wherein a subscriber device 100 is changed thus requiring a card reallocation, (5) and a card update process wherein information related to a particular credit or other card or account is updated. These explanations are exemplary only and other ways will suggest themselves to those familiar with and having skill in the art.

Figure 2:
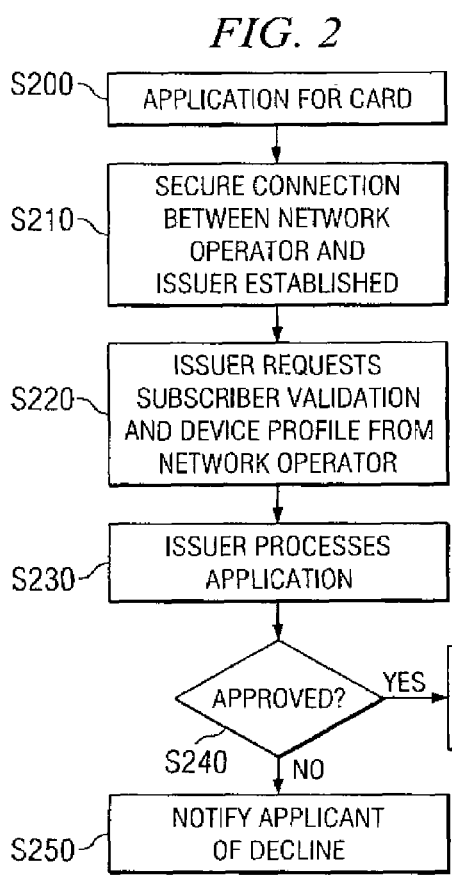
FIG. 2 is a flow chart which illustrates a card application process in accordance with the exemplary embodiment.

The flow chart of FIG. 2 will be used to explain the application process, previously referenced, wherein a subscriber applies for a card and/or account. At S200, an owner of subscriber device 100 applies to issuer 120 for an account. The application by a subscriber can be done any number of ways, including paper based, or online based. In addition to the personal information generally provided in an application, the applicant may be required to provide specific information regarding their wireless device, for example, a serial number, phone number, or other unique identifier, to aid the issuer and network operator in identifying, authenticating and provisioning service to the subscriber device 100.

In the embodiment where the carrier, whose wireless communication network supports the use of subscriber device 100, is network operator 110, the applicant may request that network operator 110 forward an application on their behalf to issuer 120. That is, because the applicant is already a customer of network operator 110, network operator 110 has access to information required for issuer 120 to process an application, and thus, network operator 110 can simply request an account application on behalf of the applicant. This would benefit both applicants and account issuers because it would reduce the time and expense associated with making an application.

At S210, a secure connection is established between issuer 120 and network operator 110. For example, a Virtual Private Network (VPN) can be used to provide further security, in addition to the security inherent and already present on the existing network, between any of the systems described in FIG. 1. For example, a VPN can be provided between issuer 120 and network operator 110 and between network operator 120 and subscriber device 100. Accordingly, the system can take advantage of the cost saving advantages, as well as secure connectivity features of a VPN. The present system is not limited to the use of VPNs however. For example, information may be encrypted via a standard encryption method including symmetric and asymmetric encryption methods. As will be understood by those having skill in the art however, any other suitable secure connectivity means can be used.

Referring back to FIG. 2, at S220, issuer 120 requests that network operator 110 validate the applicant information and provide a profile of subscriber device 100 that is associated with the specific applicant. More specifically, in the embodiment wherein network operator 110 is the applicant's wireless service provider, network operator 110 can verify and validate limited information gathered from the application. For instance, network operator 110 can verify whether the information gathered from the applicant's application are consistent with network operator records, and further, whether subscriber device 100 that applicant possesses is compatible with the system requirements. This provides an added element of security, and allows issuer 120 and network operator 110 to personalize account services in accordance with the capabilities of subscriber device 100 associated with a particular applicant.

At S230, issuer 120 processes the application. If at S240 the application is declined, the applicant is notified of the rejection at S250. On the other hand, if the application is approved, the applicant is notified of the approval and provided a secure personal identification number (PIN) code at S260.

The applicant can be notified any number of ways, including, for example, by mail to a home address, or by email. For increased security, the PIN code notification can be relayed to the applicant through some means that the applicant did not provide in the application. For example, the PIN code can be provided to an email account or an alternate mailing address received from network operator 110 during the validation process at S220, but not present on the account application. This would decrease the likelihood of applications being processed fraudulently.

Figure 3:
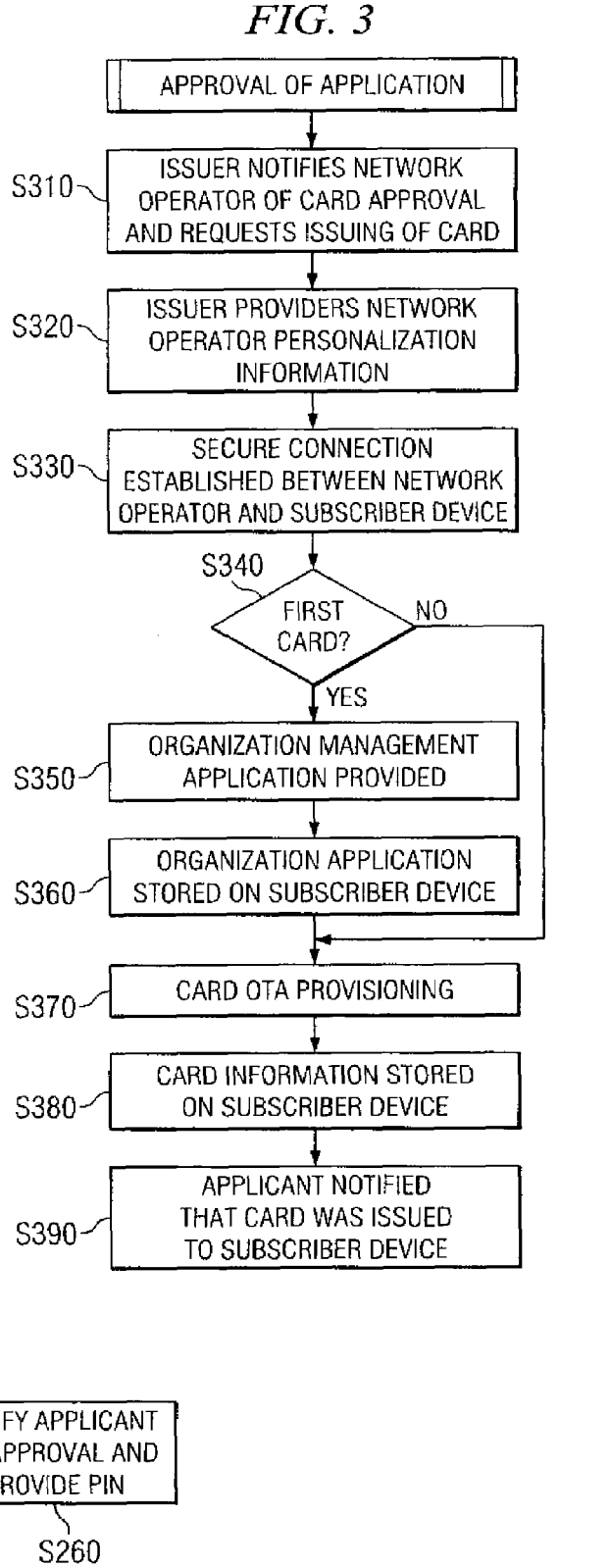
FIG. 3 is a flow chart which illustrates a card provisioning process in accordance with the exemplary embodiment.

The flow chart of FIG. 3 illustrates the steps associated with issuing a card to an applicant. Following approval of an application by issuer 120, issuer 120 notifies network operator 110 of the account approval and requests that network operator 110 issue a card operable for the account to subscriber device 100 associated with the applicant, S310. Issuer 120 then provides network operator 110 with personalization information regarding the newly approved card, S320. Personalization information can include personal identification information including account identification information, routing codes, spending limits, access codes, or membership information, for example.

Thereafter, at S330 a secure connection is established between network operator 110 and subscriber device 100 at S330 to provide a secure environment in which data can be transmitted between network operator 110 and subscriber device 100. As previously described, the secure connection can be provided by any suitable means, including a VPN or standard encryption, for example.

As a further security measure, at the time of establishing a secure connection between network operator 110 and subscriber device 100, network operator 110 can monitor network activity to determine if activities indicative of fraudulent practices are present. For example, network operator 110 can determine if more than one of subscriber device 100, including clone wireless devices, are responding to signals intended to be received and downloaded by only one specific subscriber device 100. Additionally, a position of subscriber device 100, which is responding to transmissions of network operator 110, can be determined, for example, by GPS or the like, to determine if subscriber device 100 is in a location consistent with the applicant's records, i.e., it could be determined whether subscriber device 100 is at the street address of the applicant. In the event fraudulent activities are detected, evasive measures, such as re-issuing of a subscriber device 100 and changing of card or account information can be taken to prevent unauthorized usage of a subscriber's card or account information.

Referring back to FIG. 3, at S340, it is determined whether or not subscriber device 100 has been previously used to maintain a card. If it is determined that subscriber device 100 is being used to maintain card information for the first time, i.e., YES at S340, an organization management application is downloaded to subscriber device 100 via an over-the-air interface which transmits data from network operator 110 to subscriber device 100, S350. This organization management application will allow a user to manage the cards on subscriber device 100 and allow browse and select features as previously described with reference to the capabilities of client module 102. At S360, the organization management application is then saved on subscriber device 100. In accordance with the prior explanation of the location of the memory, in the embodiment where the memory associated with client module 102 is removable or portable, during this process when information is provisioned to subscriber device 100, the memory is communicatively linked to subscriber device 100, even though it may be later removed, for example, to perform a transaction. Further, in the embodiment where the memory is maintained on the network, the organization management application can be saved on the network memory. However, alternate embodiments may not require an organization management system but still provide many of the benefits of the present disclosure.

At S370, the personalization information previously provided to network operator 110, at S320, is then transmitted to subscriber device 100. Similarly, if the answer to the inquiry at S340 was NO, indicating that subscriber device 100 is not being used to maintain a card for the first time, operations would move directly to S370 and personalization information is transmitted to subscriber device 100. In this way, subscriber device 100 is provisioned by an over-the-air transmission from network operator 110. Specifically, all information necessary to enable the use of the card on the subscriber device 100 to execute a transaction is allocated to and transmitted to subscriber device 100. The information transmitted during the provisioning process can include, for example, names, account numbers, spending limits, identification photos, authentication, such as encrypted codes, or simply a unique reference number. The present disclosure contemplates provisioning of the cards in real-time or near real-time. In other embodiments, however, some delay, such as a few seconds, minutes or longer, may be associated with card provisioning.

At S380, the personalization information that is transmitted is received and stored so that it can be accessed when desired. Thereafter, the applicant is notified that a card has been issued and can thus be activated, S390. As previously stated, applicant notification can be accomplished by any suitable means including mailing to a home address, email, or via the subscriber device 100. Additionally, as an alternative to providing the applicant with PIN code at S260 in FIG. 2, PIN code can be provided to the applicant at S390. As stated previously however, other approaches are possible.

FIG. 4 shows the process of activating a card after over-the-air provisioning of the card is completed. Specifically, after the card is issued to subscriber device 100, in order to activate the card and enable use of the card by the client module 102, the user must then request and receive validation by providing the secure PIN code, S410. The user may provide the PIN code any number of ways including, for example, by entering it directly into subscriber device 100, by calling a card or account activation center from a home number, or by entering the PIN code online. The means described are merely exemplary however; thus, any other means can be used.

At S420, network operator 110 requests that issuer 120 authenticate the PIN code provided by the user. Issuer 120 then determines whether or not the PIN code entered by the user is indeed a valid PIN code associated with the particular applicant, and notifies network operator 110 of its determination. If the PIN code entered is an invalid PIN code, i.e., NO at S440 the user is notified that the PIN code is invalid, S450. The user can then re-start the process at S410, for example, if an incorrect PIN code was inadvertently entered. As an added security feature, an applicant may be limited to a predetermined number of activation attempts before the applicant is "locked out" and prevented from activating the card without contacting network operator 110 or issuer 120.

If the PIN code entered is a valid PIN code associated with an activated card, and is thus approved by issuer 100, i.e., YES at S440, the final stages of activation can be completed before the user is notified that the virtual card is ready for use. At S460, certain critical information required to allow a card to be activated can be transmitted to subscriber device 100. For example, a certificate of authenticity, which can provide a security and non-repudiation feature for card transactions can be downloaded for the card being provisioned to subscriber device 100. The source of the certificate of authenticity can be any one of network operator 110 or the issuer 120. Finally, at S470, the user is notified that the card has been activated and is ready for use.

In accordance with one embodiment of the present disclosure, although card information may be issued and provisioned to subscriber device 100, as described in FIG. 3, subscriber device 100 may not operate to perform transactions unless and until the user's PIN code is validated and the certificate of authenticity is downloaded to subscriber device 100 in the final stages of card activation. Further, in addition to or instead of this feature, validation of the user's PIN code can serve to activate subscriber device 100 at a local level. For example, client module 102 can remain inactive, with respect to card, until the correct PIN code corresponding to that card is provided. Accordingly, only the client module 102 corresponding to the subscriber device 100 for which the PIN is entered will be activated to perform transactions with that particular card. In this way, the danger of fraudulent activity can be greatly reduced. In particular, an arrangement as described above would decrease the likelihood of successfully creating unauthorized, cloned device.

As an alternative to the use of a PIN as an authentication tool as described above, in one embodiment, biometric authentication or verification can be used. Specifically, fingerprints, iris and retina patterns, earlobe geometry, and voice waves pattern, for example, can be used to verify the identity of a subscriber.

Further still, either instead of or in addition to the authentication methods described above, whether the use of a PIN or some other method like biometric authentication, subscriber device 100 can be equipped with a unique device certificate which can be activated only when validation is complete. This would decrease the likelihood of fraud, and in particular, the likelihood of creating a clone device.

FIG. 5 illustrates a flow chart for describing the termination of a card that is stored on subscriber device 100. Initially, at S510, a secure connection is established between issuer 100 and network operator 110. At S520, issuer 120 requests that network operator 110 terminate a particular card. The termination request at S520 can include the specifics of the account or card to be terminated, for example, the customer name, and other unique card or account information necessary to execute a termination. At S530, network operator 110 notifies the subscriber that the card will be terminated. Notification can be accomplished any number of ways including, for example, via postal mail, email, telephone, or instant message delivered to the wireless device over the air. Then, at S540, network operator 110 terminates the card service of subscriber device 100 in accordance with the instructions provided by issuer 120. Finally, at S550 network operator 110 notifies issuer 120 of the termination of the card.

Notably, termination of one card does not prevent the continued use of subscriber device 100 as a means of processing transactions. Specifically, subscriber device 100 may still be functional for its primary wireless communication purposes. Additionally, in cases where several cards are stored on subscriber device 100, service to the other cards can continue uninterrupted, even if one card is terminated or discontinued.

FIG. 6 will now be used to explain the process of replacing an existing subscriber device 100 with a different device, thus requiring the transfer of the information relating to the cards that have been provisioned to the existing subscriber device 100 to the new device. Specifically, the transaction capability of the existing subscriber device 100 is disabled and transferred to the new subscriber device so that the new subscriber device can execute transactions, with the same, or related cards, previously performed by the subscriber device that was replaced.

At S610, a subscriber requests that the subscriber device 100 be replaced, and consequently all of the information regarding one or more cards residing on subscriber device 100 must be reassigned. At S620, a secure connection is established between network operator 110 and issuer 120. Thereafter, network operator 110 then informs one or more issuers 100 of the request for a device replacement, S630. At S640, issuer 100 approves the termination of whatever card or cards that had been previously provisioned to the existing subscriber device and processing for termination of service to the existing subscriber device 100 are executed. Thereafter, issuer 100 approves the issuing of service to the new device and processing for provisioning the new device with information relating to the cards are executed, S650. Finally, at S660 processing for activation as described in FIG. 4 are executed. FIG. 6 and the corresponding description is understood to encompass the embodiment wherein the account maintained by issuer 120 is terminated with service to the device being replaced and a wholly new card is issued to the new device, or the embodiment wherein the account maintained by the issuer, along with all of the account history remains unchanged and it is only the updated card or account information that is provisioned to subscriber device 100 which references the account maintained by issuer 120 that is relocated to the new device.

In accordance with the process of FIG. 6, information required for network operator 110 to provision the new device, for example, a unique serial number or identifier that would enable network operator 110 to communicate with the new device, can be provided before the existing subscriber device 100 is de-activated. Accordingly, all the steps required to activate the new device can be performed by network operator 110, even though the new device is not yet functional for wireless communication. Thus, as soon as a user activates the new device, for example, with a unique PIN code, card service to the existing subscriber device 100 can be terminated and card service to the new device can immediately begin.

Alternatively, if a user chooses to process his device replacement in person, for example, in a store, the process may be greatly simplified, while still preserving security. Specifically, the old device can be de-activated and because the user is present in person, the steps required to verify that a user is acting in good faith can be reduced to a check of the user's identification. Thereafter, the new card or card information can be issued to the new device and activated, at the time the new device is being provisioned to enable wireless communication.

Further, if the replacement is requested and processed online, at the time the new device is provisioned for wireless communication, the card can also be simultaneously provisioned. Thus, at the time new subscriber device 100 is activated for wireless communication, it can also be activated for transmitting the information relating to a particular card, i.e., for processing transactions with client module 102.

In an alternate embodiment, the existing device having the card information can be enabled for limited use to allow a user to continue to use the device for transactions only, even though the device has been replaced for its communication functions. This will only be necessary until the new device is activated for both wireless communication and transactions using client module 102.

Figure 7:
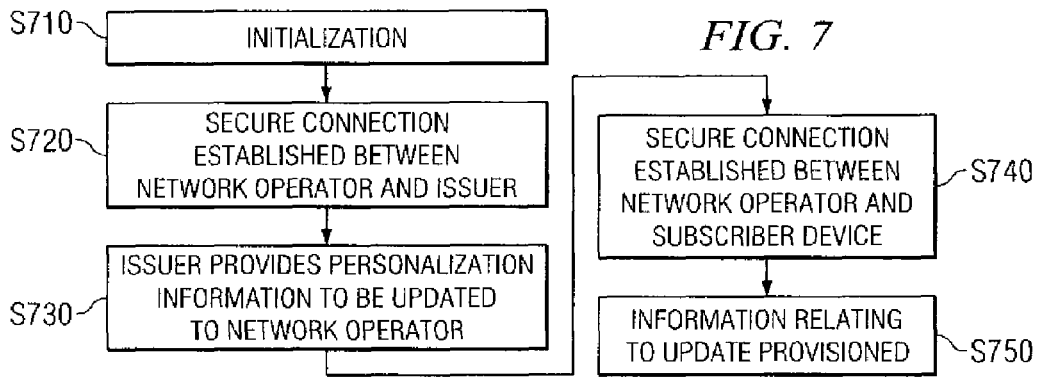
FIG. 7 is a flow chart which illustrates a process for updating or changing information relating to a card that is stored on a subscriber device in accordance with the exemplary embodiment.

FIG. 7 illustrates the process for updating information provisioned to subscriber device 100. At S710, the process is initialized. Initialization may occur in any number of ways, including automatically scheduled, or at the request of the subscriber, network operator 110, or issuer 120, or simply dictated by issuer 120, in order to change or update some aspect of the card information that was provisioned to subscriber device 100. For example, expiration information may be updated, spending limits can be altered, limitations can be placed on the different credit or other cards or accounts, and reference number information can be changed. In this explanation, initialization as described at S710 is understood to include the request to update, if one was made, and approval of the request by the proper authority, for example, the subscriber or issuer 120.

At S720, a secure connection is established between issuer 120 and network operator 110. Thereafter, at S730 issuer 120 provides the information that will be provisioned to subscriber device 100 in order to execute the desired update or change. At S740, a secure connection is established between network operator 110 and subscriber device 100. Then at S750, the information relating to the update is provisioned over-the-air to subscriber device 100.

Figure 8:
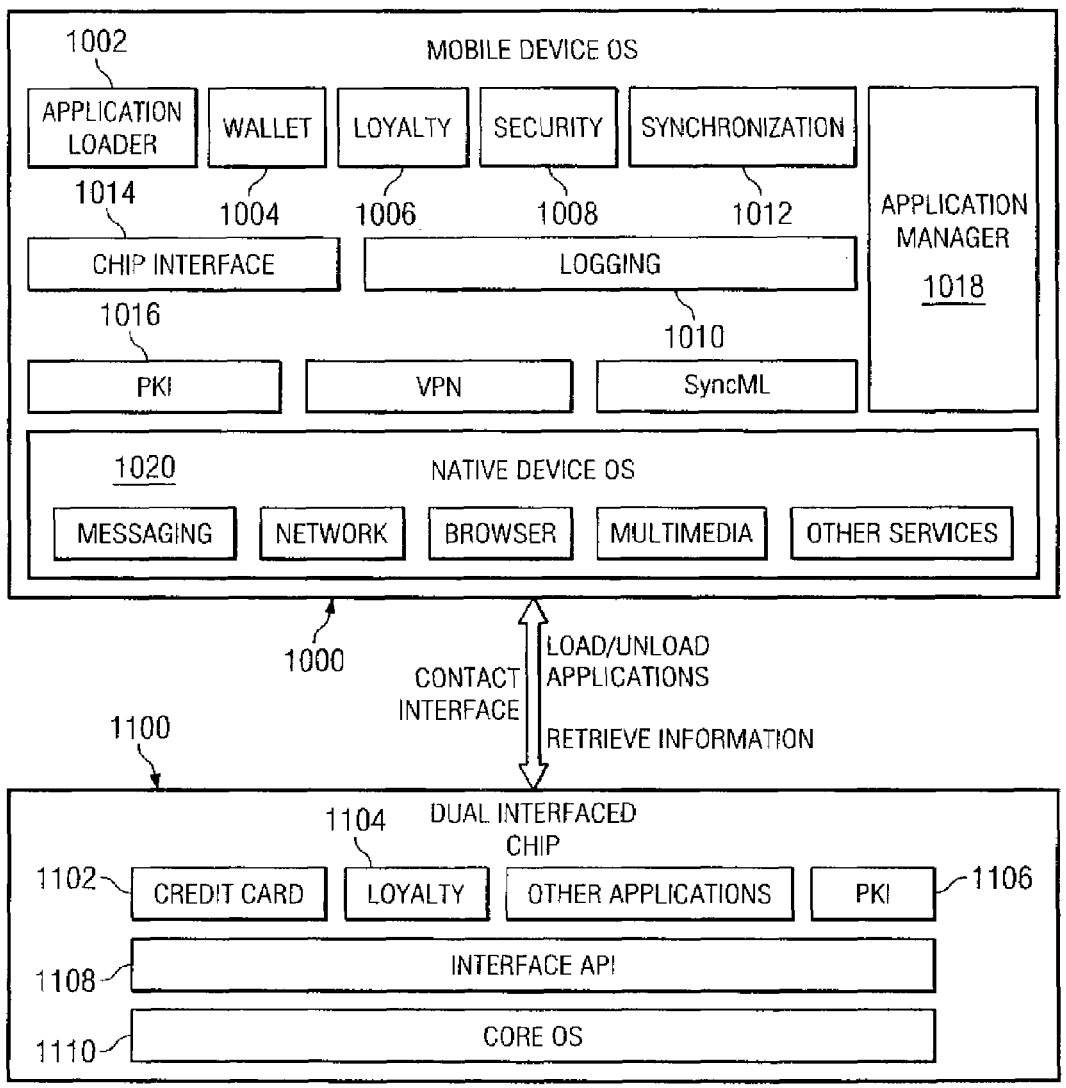
FIG. 8 is a detailed illustration of a subscriber device in accordance with an embodiment of the presently described system.

FIG. 8 is a detailed illustration, according to one embodiment, of a subscriber device 1000. According to the depicted embodiment, subscriber device 1000 is provided with a removable chip 1100. Subscriber device 1000 can be any of a cellular phone, a personal digital assistant, or pager and removable chip 1100 can be a smart card having a contact-less interface, for example. In this embodiment, removable chip 1100 is a contact-less chip that will be communicatively coupled to subscriber device 1000 at the time of provisioning the card or cards to subscriber device 1000. Although the description with reference to the embodiment of FIG. 8 contemplates that the information relating to cards provisioned to subscriber device 1000 is saved on removable chip 1100, this description is merely exemplary, and as will be appreciated by those skilled in the art other arrangements are possible.

Subscriber device 1000 includes an application loader 1002, a wallet application 1004, a loyalty tracker 1006, a security application 1008, an activities log 1010, and a synchronization application 1012. Subscriber device 1000 further includes a card interface 1014, an authenticating authority portion 1016, and an application manager 1018. In some embodiments, these components may comprise or be included with or coupled to the client module 102. Further, subscriber device 1000 operates in accordance with the control of operating system 1020.

Exemplary removable chip 1100 includes a credit card 1102, a loyalty card 1104, an authentication authority 1106, and an application program interface 1108. Removable card 1100 is controlled by operating system 1110. For the purposes of simplicity and ease of understanding, all of the components of subscriber device 1000 and removable chip 1100 have not been included in the illustration and description of subscriber device 1000 and removable chip 1100, and only those portions relevant to the discussion have been included.

With further reference to FIG. 8, the different elements of subscriber device 1000 and removable chip 1100 will now be described with more detail. Application loader 1002 is the portion of subscriber device 1000 which receives information that is provisioned to subscriber device 1000, from network operator 120, for example, and loads and unloads applications to removable chip 1100. Wallet application 1004 is provided to manage the contents of removable card 1100, including the information that relates to the different cards and accounts. Specifically, in this embodiment for example, wallet application 1004 would manage the use of credit card 1102 and loyalty card 1104 on removable chip 1100.

Further, loyalty tracker 1006 is provided to manage and track loyalty points and transactions. Security application 1008 is provided as the overall security of wallet application 1004, the security during the loading and unloading of applications to removable chip 1100, and the security between the network operator and subscriber device 1000. Security application 1008 may include VPN security or encryption, for example. Synchronization application 1012 synchronizes the information between subscriber device 1000 and the network operator.

Card interface 1014 is an application interface provided as an interface between subscriber device 1000 and removable chip 1100, which allows removable card 1100 to communicate and be controlled by subscriber device 1000. Activities log 1010 is provided to log activities, for example, transactions using credit card 1102 and loyalty card 1104 and performed with subscriber device 1000, or to log provisioning receptions. Authenticating authority portion 1016 is provided for authentication, and encryption and decryption means when data is provisioned to subscriber device 1000, for example. Application manager 1020 is the overall controller and coordinator of the different applications of subscriber device 1000.

For exemplary purposes only, removable card 1100 is illustrated including a credit card account application 1102 and a loyalty account application 1104. Thus, these applications are accessible on subscriber device 1000 in order to perform transactions. Furthermore, removable chip 1100 is equipped with the application program interface 1108 which may also function as a conduit between removable chip 1100 and subscriber device 1000.

Figure 9:
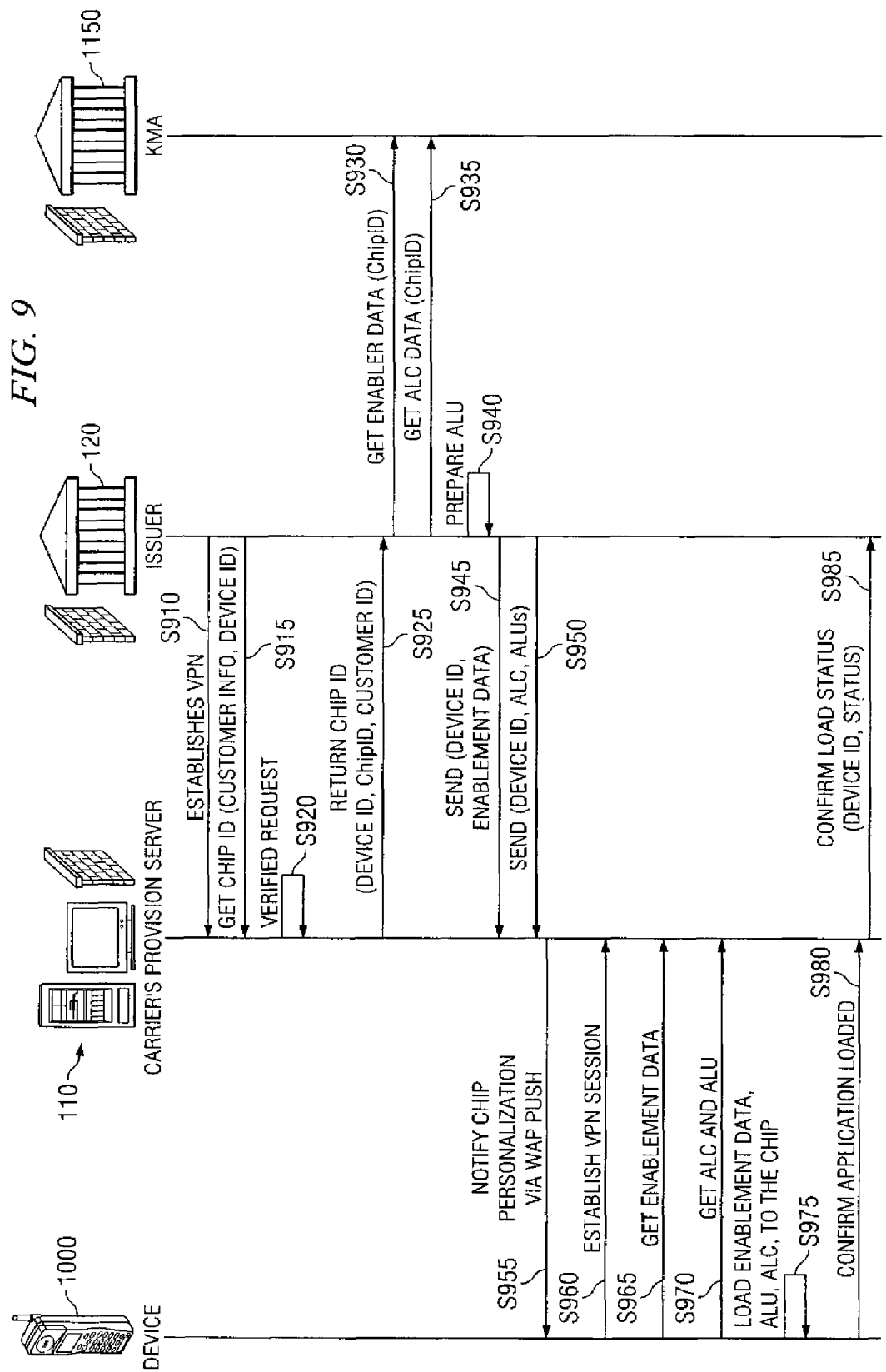
FIG. 9 is a flow chart which illustrates a process for provisioning information relating to a credit or other card or account to the subscriber device in FIG. 8.

FIG. 9 illustrates the process of provisioning information to subscriber device 1000. At S910, a secure connection, for example, using a VPN, is established between issuer 120 and network operator 110. Then, at S915, issuer 120 provides customer information and device identification information to network operator 110. Network operator 110 then verifies and validates the customer information provided by issuer 120, S920. In particular, network operator 110 can verify, based on the customer information provided by issuer 120, whether the information provided by issuer 120 is consistent with the information they have about a particular customer and the customer's device. At S925, network operator 110 provides a chip identification, which is associated with the particular removable chip 1100 corresponding to subscriber device 1000 owned by the particular customer.

Issuer 120 then requests enablement data from an authentication authority 1150, S930. Specifically, before removable chip 1100 can be used for transactions, it must first be enabled for use, which requires unique enablement data that is known to the authentication authority. At S935, issuer 120 further requests that the authentication authority 1150 provide a unique identifier, for example, an application load certificate, that will be required by removable chip 1100 as a form of authentication before information can be loaded to the removable card 1100. Thereafter, at S940 the information received from the authentication authority 1150 at S930 and S935 are used by issuer 120 to create a personalization packet of information that will include at least the information relating to the cards that will be provisioned to subscriber device 1000.

At S945 and S950, the enablement data and device identification acquired at S930, and the personalization packet of information at S940 are provided to network operator 110 from issuer 120. At S955, subscriber device 1000 is notified of the information that is ready to be provisioned to subscriber device 1000. At S960, subscriber device 1000, and more specifically, application manager 1018, establishes a secure connection between subscriber device 1000 and network operator 110. Subscriber device 1000 is provided with the enablement data and the personalization packet information at S965 and S970 respectively. At S975, the enablement data and the personalization packet information is loaded to subscriber device 1000, and in particular, in this embodiment, relayed to removable chip 1100. This can be accomplished using a WAP Push, for example, however, any other suitable means can be used. Thereafter, network operator 110 is notified of the application download by subscriber device 1000, S980. Similarly, at S985 issuer 120 is notified of the application download.

Figure 10:
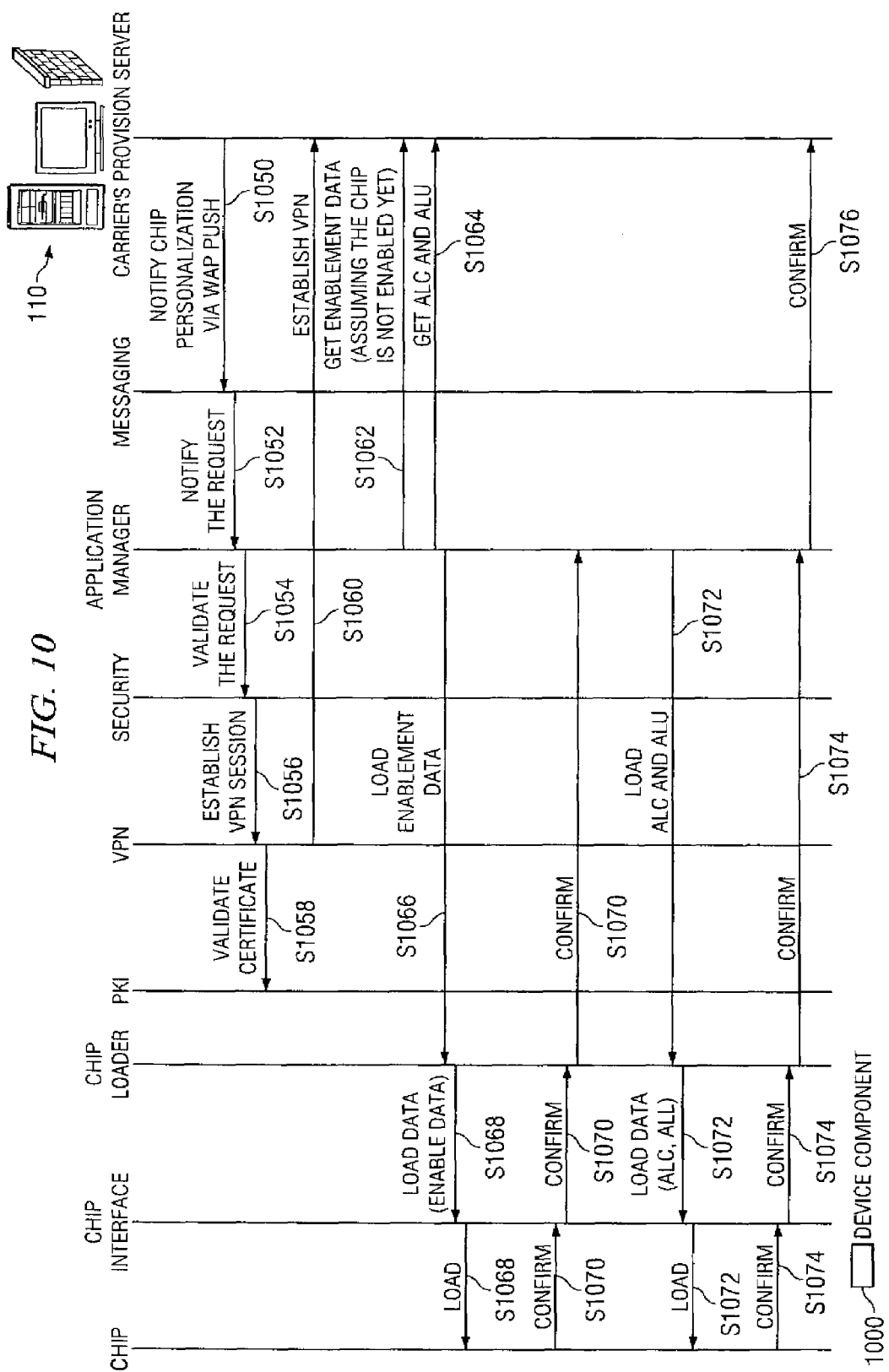
FIG. 10 is a flow chart which illustrates the process in the subscriber device of FIG. 8 when information relating to a credit or other card or account is provisioned to the subscriber device.

FIG. 10 illustrates an exemplary version of the process that occurs at the device level, i.e., subscriber device 1000, during a provisioning process. At S1050, network operator 110 notifies subscriber device 1000 of the awaiting personalization information that is ready to be provisioned and requests that subscriber device take steps to receive the information. At S1052, application manager 1018 receives the notification and requests validation of the request. At S1054, security application 1008 validates the request. Thereafter, at S1056, a security session, for example, a VPN session is requested. The certification from the authentication authority is then validated, S1058, and a secure connection, via VPN in this example, is established between subscriber device 1000 and network operator 110, S1060.

Application manager 1018 then directs actions for the retrieving of the enablement data from network operator 110, S1062, and the retrieving of personalization packet information, S1064. At S1066, the enablement data is loaded to application loader 1002. The enablement data is then loaded to removable card 1100 via card interface 1014, S1068. Confirmation of successful enablement of removable card 1100 is thus relayed back to application manager 1018, S1070. Application manager 1018 then directs the loading of the personalization packet information to removable chip 1100, which may be independently removable or coupled to a card that is removable, via application loader 1002 and card interface 1014, S1072. Confirmation of the successful download of the personalization packet information is then relayed to application manager, S1074. Similarly, confirmation is relayed from application manager 1018 to network operator 110, S1076.

While several embodiments have been provided in the present disclosure, it should be understood that the present system and method may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by on skilled in the art and could be made without departing from the spirit and scope disclosed herein.

What is claimed is:

1. A system for over-the-air provisioning of a card on a wireless device, the system comprising:
   a wireless device having a removable chip;
   an issuer system to maintain an account related to a card; and
   an authentication authority having enablement data and a unique identifier related to the removable chip;
   wherein the authentication authority provides the enablement data and the unique identifier related to the removable chip to the issuer system; and
   wherein the issuer system uses the enablement data to enable the removable chip for use and the unique identifier to authenticate the removable chip before loading information related to the card onto the removable chip.

2. The system of claim 1, wherein the unique identifier is an application load certificate.

3. The system of claim 1, wherein the card is further defined as a credit card.

4. The system of claim 1, wherein the card is further defined as a loyalty card.

5. The system of claim 1, wherein the card is further defined as a security card.

6. The system of claim 5, wherein the security card is further defined by a pass card.

7. The system of claim 5, wherein the security card is further defined as an identification card.

8. The system of claim 1, wherein the issuer system is further defined as a system of a financial institution.

9. The system of claim 1, wherein the issuer system is further defined as a system of a business and wherein the card is further defined as a card accepted by the business.

10. The system of claim 1, wherein the wireless device includes a client module wherein the card is enabled, the wireless device further includes a transaction module operable to communicate between with the client module and a transaction device at a vender location.

11. The system of claim 10, wherein the transaction module is further defined as a contact-less module to communicate with the transaction device at the vender location.

12. The system of claim 11, wherein the contact-less module is further defined as an infra-red module to communicate with the transaction device at the vender location.

13. The system of claim 11, wherein the transaction module is further defined as a wireless module to communicate with the transaction device at the vender location.

14. The system of claim 11, wherein the transaction module is operable to communicate with the transaction device at the vendor location using BLUE-TOOTH.

15. The system of claim 11, wherein the transaction module is operable to communicate with the transaction device at the vendor location using RF communication.

16. The system of claim 11, wherein the transaction module is operable to communicate with the transaction device at the vendor location using WiFi communication.

17. The system of claim 1, the wireless device comprises:
   a security component having a certificate related to authenticity of the wireless device and the card; and
   a storage component that is operable to store a plurality of cards.

18. The system of claim 17, wherein the wireless device is provided with an application to organize the plurality of cards on the wireless device stored in the storage component.

19. The system of claim 1, wherein the wireless device is a wireless telephone.

20. The system of claim 1, wherein the wireless device is a digital phone.

21. The system of claim 1, wherein the wireless device is a cellular phone.

22. The system of claim 1, wherein the wireless device is a personal digital assistant.

23. The system of claim 1, wherein the card is wirelessly provisioned on the wireless device via a code division multiple access network.

24. The system of claim 1, wherein the card is wirelessly provisioned on the wireless device via a wireless local area network.

25. The system of claim 1, wherein the card is wirelessly provisioned on the wireless device via a global system for mobile communications.

26. The system of claim 1, wherein the card is wirelessly provisioned on the wireless device via a virtual private network.

27. A method for over-the-air provisioning of a card on a wireless device, the method comprising:
an issuer:
authorizing an account related to a card;
notifying a network operator of the authorization; and
requesting that the network operator issue the card operable for the account to a wireless device; and
the network operator:
issuing the card to the wireless device;
at the time of issuing the card to the wireless device, monitoring network activity for fraudulent activity; and
if fraudulent activity is detected, implementing evasive measures to prevent unauthorized usage of the card.

28. The method of claim 27, wherein the fraudulent activity includes the wireless device being in a location that is not consistent with the network operator's records.

29. The method of claim 27, wherein the fraudulent activity includes more than one wireless device responding to signals from the network operator.

30. The method of claim 27, wherein the evasive measures include reissuing a wireless device.

31. The method of claim 27, wherein the evasive measures include changing the card.

32. The method of claim 27, wherein the evasive measures include changing the account information associated with the card.

33. The method of claim 27, wherein the card is further defined as a credit card.

34. The method of claim 27, wherein the card is further defined as a loyalty card.

35. The method of claim 27, wherein the card is further defined as a security card.

36. The method of claim 35, wherein the security card is further defined by a pass card.

37. The method of claim 27, wherein the security card is further defined as an identification card.

38. The method of claim 27, wherein the issuer is further defined as a financial institution.

39. The method of claim 27, wherein the issuer is further defined as a business and wherein the card is further defined as a card accepted by the business.

40. The method of claim 27, wherein the wireless device includes a client module wherein the card is enabled, the wireless device further includes a transaction module operable to communicate between with the client module and a transaction device at a vender location.

41. The method of claim 40, wherein the transaction module is further defined as a contact-less module to communicate with the transaction device at the vender location.

42. The method of claim 41, wherein the contact-less module is further defined as an infra-red module to communicate with the transaction device at the vender location.

43. The method of claim 41, wherein the transaction module is further defined as a wireless module to communicate with the transaction device at the vender location.

44. The method of claim 41, wherein the transaction module is operable to communicate with the transaction device at the vendor location using BLUE-TOOTH.

45. The method of claim 41, wherein the transaction module is operable to communicate with the transaction device at the vendor location using RE communication.

46. The method of claim 41, wherein the transaction module is operable to communicate with the transaction device at the vendor location using WiFi communication.

47. The method of claim 27, the wireless device comprises:
a security component having a certificate related to authenticity of the wireless device and the card; and
a storage component that is operable to store a plurality of cards.

48. The method of claim 47, wherein the wireless device is provided with an application to organize the plurality of cards on the wireless device stored in the storage component.

49. The method of claim 27, wherein the wireless device is a wireless telephone.

50. The method of claim 27, wherein the wireless device is a digital phone.

51. The method of claim 27, wherein the wireless device is a cellular phone.

52. The method of claim 27, wherein the wireless device is a personal digital assistant.

53. The method of claim 27, wherein the card is wirelessly provisioned on the wireless device via a code division multiple access network.

54. The method of claim 27, wherein the card is wirelessly provisioned on the wireless device via a wireless local area network.

55. The method of claim 27, wherein the card is wirelessly provisioned on the wireless device via a global system for mobile communications.

56. The method of claim 27, wherein the card is wirelessly provisioned on the wireless device via a virtual private network.

* * * * *